Dec. 7, 1948. F. A. McDUNNAH 2,455,692
VELOCIPEDE TOY SHOVEL ATTACHMENT
Filed March 27, 1947 2 Sheets-Sheet 1

Inventor=
Frederick A. McDunnah,
By Arthur F. Randall
Atty.

Dec. 7, 1948.  F. A. McDUNNAH  2,455,692
VELOCIPEDE TOY SHOVEL ATTACHMENT
Filed March 27, 1947  2 Sheets-Sheet 2
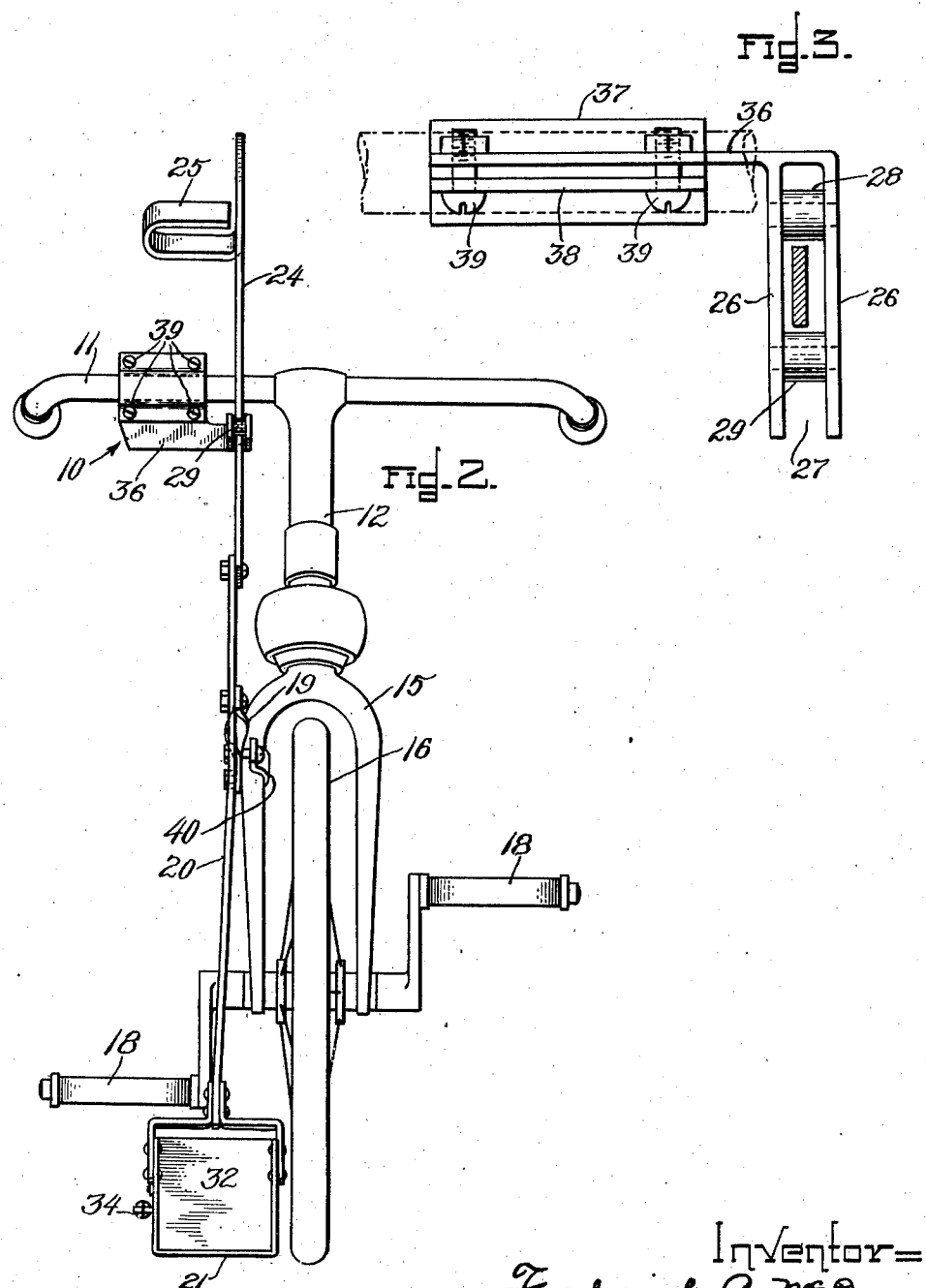

Patented Dec. 7, 1948

2,455,692

UNITED STATES PATENT OFFICE 2,455,692

VELOCIPEDE TOY SHOVEL ATTACHMENT

Frederick A. McDunnah, Hampton Falls, N. H.

Application March 27, 1947, Serial No. 737,530

5 Claims. (Cl. 214—131)

This invention relates to improvements in velocipedes and to a shovel attachment therefor.

The invention has for its primary object to provide a toy in the form of a velocipede equipped with a shovel mechanism adapted to be manipulated by the rider of the vehicle and by which material may be scooped from the ground, elevated and transported by means of the velocipede to a selected place where it may be dumped.

In the preferred embodiment of the invention the shovel mechanism is constructed as a self-contained attachment for an existing velocipede.

In the accompanying drawings—

Figure 2 is a front elevation of the velocipede shown in Fig. 1.

Figure 3 is a section on line 3—3 of Fig. 1.

Figure 1:
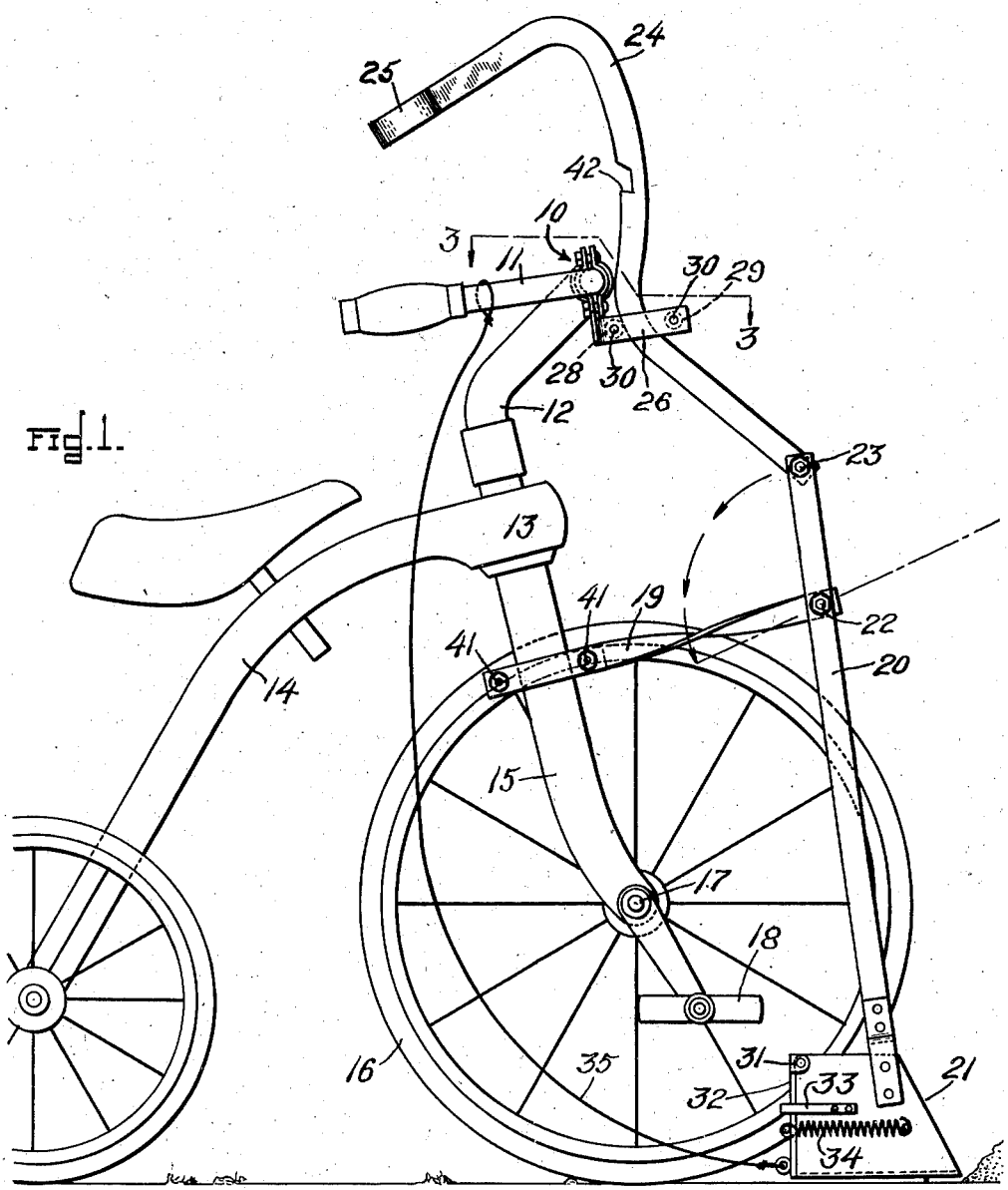
Figure 1 is a side elevation of a three-wheel velocipede having applied thereto a shovel attachment constructed in accordance with this invention.

The illustrated embodiment of my invention comprises a guide bracket 10 rigidly fixed to one of the handle bars 11 of a three-wheel velocipede, said handle bar being, as usual, a rigid part of the steering post 12 that is journaled within a bearing 13 forming part of the frame 14 of the vehicle. The post 12 is provided at its lower end with a fork 15 within which is arranged the dirigible front wheel 16 that is fixed on the front axle 17 which, as usual, extends through the branches of fork 15 at their lower ends and is provided at its outer ends with pedals 18.

Fixedly clamped at its one end to one of the tines of fork 15 is a forwardly extending cantilever arm 19 supporting a lever member 20 to whose lower end is fixedly attached the body of a scoop or bucket 21, said lever member 20 being pivotally connected adjacent to its upper end, as at 22, to the forward end of the cantilever arm 19.

The upper end of lever member 20 is pivotally connected at 23 to the lower end of a bucket-operating member 24 herein shown as a flat bar of metal, of sigmoidal or angulated shape, said member being provided at its upper end with a handle 25 by means of which it is operated and controlled by one hand of the rider while he utilizes the other hand in steering the vehicle.

The lower part of guide bracket 10 is made with a pair of forwardly extending arms 26 which provide between them a slot 27 through which the operating and controlling member 24 extends. Also disposed within this slot 27 are two anti-friction rolls 28 and 29 that are rotatably supported within the slot 27 by pintles 30. The rolls 28 and 29 are, as shown, disposed at opposite sides of the operating member 24.

Pivotally mounted at 31 upon the oppositely disposed side walls of scoop or bucket 21, is a closure member or door 32 that is normally held in position to close the rear end of the scoop or bucket 21 by means of a spring latch 33 and a spring 34. Closure member 32 has fastened to its lower end a flexible cable or strand 35 which extends upwardly therefrom to the handlebar 11 to which it is fastened as shown in Fig. 1.

The guide bracket 10 (Fig. 1) comprises a rear member 36 formed with a socket 37 that is fitted against one side of the handlebar 11 and a front member 38 formed with a socket to fit against the front side of the handlebar. These two members are apertured to receive four bolts 39 by which the two members are clamped securely to said handlebar.

The rear end portion of the cantilever arm 19 is fitted against the outer side of its tine of fork 15 against which it is fixedly held by a clamp 40 (Fig. 2) fitted against the opposite side of said tine and fastened to the cantilever arm by two bolts 41 (Fig. 1).

With the parts of the bucket mechanism occupying the positions shown in Figs. 1 and 2, the bucket 21 is in close proximity to the ground with its open end foremost. It will therefore be clear that forward movement of the velocipede will cause the bucket to scoop loose material from the ground and thereafter by swinging the lever member 20 on pivot 22 in the direction indicated by the arrows in Fig. 1, said lever with the attached and filled bucket will be swung upwardly into the position indicated by the broken line. This movement of the bucket into an elevated position is effected by first shoving the upper end portion of the angulated operating member 24 forwardly and then downwardly through the slot 27, Fig. 3. When the angulated control member 24 is thus moved into its lowermost position, a notch 42 formed in the upper part thereof may be engaged with the innermost roll 30 of guide bracket 10 thereby locking said member 24 in its lowermost position and with the bucket 21 in its raised position and with lever 20 in the position indicated by the broken line in Fig. 1. While member 24 is thus locked in its lowermost position, the velocipede may be propelled over the ground to a selected position where the strand or cable 35 is pulled upon by the rider to open the door or closure 32 thereby to effect the discharge of the contents of the bucket. The parts of the mechanism may thereafter be returned to the position shown in Fig. 1 merely by disengaging the notch 42 from the rearmost roll 30 whereupon gravity may return the parts to the positions shown.

The above described bucket mechanism attachment is of very simple and inexpensive construction and is capable of being easily fixed in position upon the velocipede or removed therefrom.

What I claim is:

1. In a velocipede, the combination with the steering post provided at its upper end with a handle bar and at its lower end with a fork within which a dirigible front wheel is rotatably mounted, of a cantilever arm fixedly supported at its one end by one of the tines of said fork and extending forwardly therefrom; a lever member pivotally connected intermediate its ends to the forward end of said cantilever arm, said lever member being provided at its one end with a scoop that is disposed closely adjacent to the ground when said lever member occupies an approximately perpendicular position and which is shifted forwardly and upwardly when said member is swung in one direction on said pivotal connection thereby to cause said scoop to be loaded with material from the ground; means operable by the rider of the velocipede for dumping the contents of the scoop while the latter occupies its elevated position; a slotted guide arm fixedly supported by said handle bar and extending forwardly therefrom, and an angulated lever-operating member loosely confined intermediate its opposite ends within the slot of said guide arm and having its lower end pivotally connected with the opposite end of said lever member while the opposite end portion of said angulated lever-operating member occupies a position above the level of the handle bar to serve as a handle by means of which said lever-operating member is manually adjusted pivotally and endwise within said slot by the rider of the velocipede to operate and control said lever member.

2. In a velocipede, the combination of claim 1 wherein a pair of spaced-apart abutments are provided within the slot of said guide arm loosely confining said angulated lever-operated member therein and wherein said angulated lever-operating member is a rigid bar that is curved longitudinally and movable both bodily endwise and also pivotally within said guide arm between said abutments to operate said lever member.

3. In a velocipede, the combination of claim 1 wherein said scoop is made with a body having a door at the rear thereof that is hingedly connected thereto; wherein a spring is provided on said body for normally holding said door in its closed position, and wherein a flexible cable is provided whereof one end is fastened to the velocipede within reach of the rider thereof and the other end is connected with said door, said cable providing means through which the rider may at will pull the door open to dump the contents of the scoop while the latter occupies an elevated position.

4. An attachment for an existing velocipede having a steering post provided at its upper end with a handle bar and at its lower end with a fork within which a dirigible front wheel is rotatably mounted, said attachment comprising a cantilever arm; means fixedly clamping said arm to one of the tines of said fork so that said arm extends forwardly therefrom; a lever member pivotally connected intermediate its ends to the forward end of said arm and provided at its one end with a scoop that is disposed closely adjacent to the ground when said lever member occupies an approximately perpendicular position and which is shifted forwardly and upwardly when said member is swung in one direction on said pivotal connection thereby to cause said scoop to be loaded with material from the ground; means operable by the rider of the velocipede for dumping the contents of the scoop while the latter occupies its elevated position; a slotted guide arm; means fixedly clamping said guide arm to said handle bar so that said arm extends forwardly thereof; a curved lever-operating member whose intermediate portion occupies the slot of said guide arm and whose lower end is pivotally connected to the opposite end of said lever member with the upper end portion of said lever-operating member extending above the level of the handle bar to serve as a handle by means of which said lever-operating member is manually actuated by the rider of the velocipede, and a pair of spaced-apart abutments within the slot of said guide arm by which said lever-operating member is loosely confined within said slot.

5. An attachment according to claim 4 and wherein said lever-operating member is made with a shoulder engageable with one of said abutments to lock said lever-operating member and said lever member in positions where they support the scoop in an elevated position, lateral adjustment of said lever-operating member away from said abutment unlocking said parts for return to their normal positions where the scoop is adjacent to the ground.

FREDERICK A. McDUNNAH.

REFERENCES CITED

The following references are of record in the file of this patent:

UNITED STATES PATENTS

| Number | Name | Date |
|---|---|---|
| 631,096 | Smith | Aug. 15, 1899 |
| 644,380 | Voegele | Feb. 27, 1900 |
| 1,500,104 | Carlberg | July 8, 1924 |
| 1,780,806 | Williams | Nov. 4, 1930 |

FOREIGN PATENTS

| Number | Country | Date |
|---|---|---|
| 881 | Great Britain | Jan. 11, 1913 |